Patented Mar. 21, 1950

2,500,921

UNITED STATES PATENT OFFICE 2,500,921

BISMUTH-ASPERGILLIC ACID COMPLEX
AND METHOD FOR ITS PRODUCTION

Andres Goth, Dallas, Tex.

No Drawing. Application August 11, 1947,
Serial No. 768,057

6 Claims. (Cl. 260—250)

My invention relates to antibiotic compounds and more particularly to therapeutically useful antibiotic organobismuth compounds.

It is known that *Aspergillus flavus* mold produces antibiotic substances when grown under suitable culture conditions and that two types of antibiotic material may be produced in the culture medium. One type is thermally unstable and comprises a single substance which resembles penicillin in its chemical and physiological properties. [McKee et al., Proc. Soc. Exptl. Biol. Med. 53, 33 (1943); Bush and Goth, J. Pharmacol. and Exp. Therap. 78, 164 (1943)]. The other type is thermostable, and possesses antibiotic properties different from those of the thermolabile substances [White et al., J. Bact. 45, 433 (1943)]. Among the thermostable products which have been isolated are aspergillic acid which melts at about 93° C. and hydroxyaspergillic acid which melts at about 149° C.

The type of antibiotic material produced by *Aspergillus flavus* mold appears to be influenced at least in part by the culture medium in which the mold is grown, and also may depend upon the conditions of mold growth. The prior art has shown that culture media containing corn steep liquor in substantial amounts tend to promote the production of the penicillin-like antibiotic substances, whereas culture media known to the art as peptone media, promote the production of the thermostable antibiotic material and tend to suppress the production of the thermolabile antibiotic substances. The prior art has also shown that variations in the constituents of the peptone-type medium may affect the composition of the thermostable antibiotic material produced by the mold. Thus for example, the incorporation of an amount of brown sugar in a peptone culture medium is reported to increase the amount of hydroxyaspergillic acid produced by the mold.

My invention is directed to novel antibiotic compounds which comprise bismuth in combination with thermostable antibiotic material such as that set forth illustratively in the preceding paragraphs, and to methods of producing my novel antibiotic compounds. I have found that by combining bismuth with thermostable antibiotic material produced by the *Aspergillus flavus* mold, I obtain organobismuth compounds of great antibiotic activity. I have found that my novel compounds possess many times the antibiotic activity possessed by the parent or uncombined antibiotic material, and possess an activity far in excess of any exhibited by previously known bismuth compounds. Unexpectedly, my novel compounds possess a uniformly high antibiotic activity in contrast to the wide range of activities of the thermostable antibiotic mold substances.

My novel organobismuth compounds are white or cream-colored solids which melt at about 70° C. and which contain about 20 percent bismuth, the exact melting points and bismuth content being dependent upon the particular antibiotic substance or mixture of substances used as starting material. My organobismuth compounds are only very slightly soluble in water but are readily soluble in the common organic solvents including ether, chloroform and carbon tetrachloride. They are organobismuth complexes, by which I mean that the chemical combination involves the presence of "secondary" or "co-ordinate" valence bonds as contrasted to "primary" or "simple" valence bonds. Thus, the organobismuth compounds of my invention may be called complex or co-ordination compounds.

The novel organobismuth compounds of this invention may be prepared in crude form by adding a water-soluble bismuth compound to the culture medium in which thermostable antibiotic products have been produced by *Aspergillus flavus* mold. However, for reasons of therapeutic efficiency and for ease of isolation and purification of the bismuth complexes, I prefer to obtain the thermostable antibiotic material in purified or partially purified condition, as may be done by any of the known extractive or adsorptive procedures, and to prepare the complex by treating the antibiotic material with a suitable bismuth compound. It is desirable to have both the thermostable antibiotic material and the bismuth compound in solution, and it is preferable that the solutions used be substantially aqueous since the organobismuth complex is only very slightly soluble in water and hence is readily separable. If, for example, the organobismuth complex is prepared by mixing water-miscible organic solutions of the thermostable mold product and a soluble bismuth compound, the organobismuth complex is readily separated by adding an excess of water to the mixture of the organic solutions thereby causing the organobismuth complex to precipitate and facilitating its separation. The antibiotic organobismuth complex may be separated from aqueous solutions in which it is prepared, by filtration or centrifugation, or by extracting the precipitated complex with a water-immiscible solvent, and recovering the organobismuth complex from the solvent by evaporation. Preferred solvents are those having low boiling points, such as ether, chloroform and the like. Purification of the organobismuth complex may be accomplished by solution of the complex in an organic solvent, treatment with decolorizing carbon, and recovery of the complex by evaporation, preferably at room temperature.

Numerous bismuth compounds may be used in preparing my novel antibiotic bismuth complexes, and many suitable compounds will be apparent to those skilled in the art. When aqueous solutions are used in the preparation of the bismuth complexes, it is desirable to use a bismuth compound which will not hydrolyze readily in water, thus avoiding the necessity of adding acid to maintain the bismuth compound in solution. Large excesses of acid are to be avoided, as they inhibit the precipitation of the antibiotic bismuth complex. The amount of bismuth compound used in preparing the antibiotic bismuth complex is not critical, but to insure the complete utilization of the thermostable antibiotic material it is desirable to use an amount of bismuth compound equivalent to one or two times the weight of the thermostable antibiotic material to be reacted.

The novel organobismuth complexes of this invention possess a marked antibiotic activity against many micro-organisms. Thus for example, a concentration of the complex of the order of one part of complex to 500,000 parts of diluent effectively inhibits all growth of Staphylococcus aureus, pneumococus type 1, and Shigella alkalescens; and a concentration of the order of one to one million inhibits all growth of organisms such as Brucella melitensis and Mycobacterium tuberculosis.

The following specific examples illustrate methods suitable for the preparation of novel compounds of my invention:

*Example 1*

A culture medium is prepared comprising 15 liters of water containing 2 percent dextrose, 0.5 percent sodium chloride and 2 percent of trypsin-hydrolyzed casein. The culture medium is distributed in 30 Fernbach flasks and sterilized in an autoclave. The sterilized medium in the flasks is inoculated with a strain of Aspergillus flavus mold isolated by Bush and Goth [Bush and Goth, J. Pharmacol. and Exp. Therap. 78, 164 (1943)], and the mold is grown at room temperature for about 10 days. The culture medium is filtered to remove the mold growth, acidified to about pH 2 with 50 percent phosphoric acid, and extracted with 6 liters of butyl acetate in a counter-current spray extraction column such as that described by Bush and Goth [Ind. and Eng. Chem., Anal. Ed. 16, 528 (1944)]. The butyl acetate extract containing the thermostable antibiotic material is treated with about 200 cc. of 0.2 N sodium bicarbonate solution and the bicarbonate solution containing the antibiotic material is acidified to about pH 2 by the addition of 1 N hydrochloric acid and is extracted with about 150 cc. of ether. The ether extract is evaporated leaving the antibiotic material as a residue. The residue is dissolved in about 100 cc. of methanol, the solution is treated with 6 g. of activated decolorizing carbon and is filtered. The filtrate is reduced in volume by evaporation at room temperature until a slight precipitate appears and is then cooled to about 0° C. for several hours whereupon 1.2 g. of thermostable antibiotic substance in crystalline form is obtained.

The thermostable antibiotic substance so obtained is purified by recrystallizing it from methanol and when so recrystallized, melts at about 128° C.

50 mg. of the antibiotic substance thus obtained are dissolved in about 5 cc. of 1 N sodium bicarbonate solution and mixed with a solution of 50 mg. of bismuth acetate dissolved in about 2 cc. of glacial acetic acid. To the mixture 1 N sodium hydroxide is added until the solution is about pH 9. The organobismuth complex separates as a curdy precipitate. The mixture is extracted with about 100 cc. of ether and the ether is evaporated at room temperature, leaving the organobismuth complex as a solid residue of slightly yellow color.

The organobismuth complex thus prepared possessed a marked growth-inhibiting effect on many micro-organisms. The complex was soluble in alcohol, methanol, propyleneglycol, ether, chloroform and carbon tetrachloride and similar solvents, but was only very slightly soluble in water.

*Example 2*

80 liters of culture medium are prepared containing 20 g. of trypsin-hydrolyzed protein, 2 g. of dextrose, 5 g. of sodium chloride, 2.5 g. of disodium phosphate and 25 g. of glucose per liter of culture medium. The culture medium is sterilized and inoculated with an aqueous suspension of Aspergillus flavus mold of the same strain as was used in Example 1. The mold is grown on the surface of the culture medium for about nine days at a temperature of about 37° C. The culture medium is then filtered to remove the mold growth and the filtrate is acidified to about pH 2.5 with 50 percent phosphoric acid. To the acidified filtrate are added about 50 l. of butyl acetate and the mixture is stirred well for about one hour. The butyl acetate containing the antibiotic material produced by the mold is separated and is extracted with about 4 liters of N/10 sodium bicarbonate solution, and then twice with 4 liters of N/10 sodium hydroxide solution. The aqueous extracts are combined and extracted with about 1.5 liters of ether to remove miscellaneous impurities. The extracted aqueous solution is acidified with about 1 N hydrochloric acid to about pH 2 and the acidified aqueous solution is extracted three times with a total of about 9 liters of ether. The ether extracts are combined and evaporated in vacuo at room temperature. The oily residue comprising impure thermostable antibiotic material is dissolved in about 500 cc. of methanol and the solution is treated with about 20 g. of decolorizing carbon and filtered. The filtrate is concentrated in vacuo to a volume of about 100 cc. 100 cc. of 50 percent methanol are then added and the solution is concentrated to a volume of about 75 cc. The concentrated solution is cooled to about 5° C. for several hours during which time the antibiotic material separates in the form of crystals. The crystalline material is purified by several recrystallizations from dilute methanol.

The antibiotic material obtained in accordance with the above procedure weighed about 15 g. After prolonged drying it melted at about 137° C. and upon analysis showed the presence of 60.46 percent carbon, 8.55 percent hydrogen, and 11.75 percent nitrogen which corresponded to an empirical formula of $C_{12}H_{20}N_2O_3$.

30 g. of antibiotic material obtained in accordance with the above procedure are dissolved in about 300 cc. of methanol and added slowly with stirring to a solution of 10 g. of sodium carbonate dissolved in 2700 cc. of water. During the addition of the methanol solution dry sodium carbonate is added from time to time to maintain the pH of the solution between 7.5 and 8. To the resulting solution there are added slowly with stirring 3 liters of a 1.5 percent solution of sodium bismuth ammonium citrate whereupon there separates a white curdy precipitate of the organobismuth complex. The mixture is stirred for about 15 minutes and is then extracted first with about 3 liters of ether and then with about 1.5 liters of ether. The ether extracts in which the organobismuth complex is dissolved are combined and evaporated in vacuo at room temperature, leaving the organobismuth complex as a solid residue. The residue is dissolved in about 500 cc. of anhydrous ether, the solution filtered to remove any insoluble material and the filtrate is evaporated at room temperature in vacuo, leaving the organobismuth complex as a solid residue. Solution in anhydrous ether and evaporation of the ether are repeated until no more insoluble material is observed and the residue of organobismuth complex is free from moisture.

The antibiotically active organobismuth complex obtained in accordance with the above procedure was a slightly yellow crystalline material which melted at about 70–72° C. It possessed marked antibiotic properties against many microorganisms.

*Example 3*

Aspergillic acid melting at about 93° C. and prepared by growing the *Aspergillus flavus* mold strain isolated by White [Science 92, 127 (1940)] in a plain tryptone culture medium is converted into an organobismuth complex according to the method described in Example 2.

The organobismuth complex thus obtained was a slightly yellow solid which melted at about 55–58° C. and which showed the high degree of antibiotic activity possessed by the organobismuth complexes obtained in accordance with the procedures of Examples 1 and 2.

*Example 4*

Hydroxyaspergillic acid melting at about 149° C. and prepared by growing the *Aspergillus flavus* mold strain isolated by White [Science 92, 127 (1940)] in a trpytone culture medium to which brown sugar was added, is converted in an organobismuth complex according to the method described in Example 2.

The organobismuth complex thus prepared was a substantially white solid which melted at about 78–81° C. and which displayed the high degree of antibiotic activity possessed by the organobismuth complexes prepared in accordance with the procedures described in Examples 1 and 2.

I claim:

1. An antibiotic compound comprising a coordination complex of bismuth and a thermostable antibiotic material of the group consisting of aspergillic acid and hydroxyaspergillic acid.

2. As a new antibiotic compound, a bismuth-aspergillic acid complex.

3. As a new antibiotic compound, a bismuth-hydroxyaspergillic acid complex.

4. The process of preparing antibiotic compounds which comprises reacting in solution a soluble bismuth compound and a thermostable antibiotic substance of the class consisting of aspergillic acid and hydroxyaspergillic acid produced by *Aspergillus flavus* mold.

5. The process of preparing antibiotic compounds which comprises treating an aqueous solution of thermostable antibiotic material of the class consisting of aspergillic acid and hydroxyaspergillic acid with a water-soluble bismuth compound.

6. The process of preparing antibiotic compounds which comprises treating a slightly alkaline aqueous solution of an antibiotic substance of the class consisting of aspergillic acid and hydroxyaspergillic acid, with an aqueous solution of bismuth salt, and separating from the solution the antibiotic organobismuth complex which precipitates.

ANDRES GOTH.

REFERENCES CITED

The following references are of record in the file of this patent:

Abraham-British J. of Exp. Pathology, June 1942, vol. 23, p. 108.

Science, Aug. 2, 1942, vol. 104, pp. 102–104.

J. Biol. Chem., vol. 155, pp. 359–360 (1944).

Lancet, January 27, 1945, p. 129.

J. American Medical Assoc., May 25, 1946, vol. 131, pp. 271–275.

Nature, November 16, 1946, p. 709.

Salivar, January 31, 1947, Separation and Identification of Penicillin Species, p. 1.

Science, June 27, 1947, p. 658.

Kolmer, Arch. Derm. & Syph., August 1947, p. 183.

J. American Pharma. Soc. Pharm. Abstracts Sect., p. 304, October 1947 (based on article published November 14, 1946).